Patented June 16, 1925.

1,542,350

UNITED STATES PATENT OFFICE.

CARL RAYMOND WHITTEMORE, OF MONTREAL, QUEBEC, CANADA, ASSIGNOR TO JOHN IRWIN AND REGINALD HILL MONK, BOTH OF MONTREAL, CANADA.

PROCESS OF TREATING TITANIFEROUS IRON ORES AND THE PRODUCTS THEREOF.

No Drawing.   Application filed July 28, 1924.   Serial No. 728,711.

*To all whom it may concern:*

Be it known that I, CARL RAYMOND WHITTEMORE, a subject of the King of Great Britain, residing at the city of Montreal, in the Province of Quebec, Dominion of Canada, have invented new and useful Improvements in the Processes of Treating Titaniferous Iron Ores and the Products Thereof, of which the following is a specification.

This invention relates to the treatment of titaniferous ores and particularly to those containing iron.

The object of my invention is the separation of the iron content from the titanium content.

A further object is the production from titaniferous ores of an iron solution adapted for electric deposition, or conversion into pigments.

A further object is the production of a titaniferous residue adapted for the extraction of titanium oxide.

A further object is to produce uniform products in treating titaniferous ores in which the proportions of iron and titanium may vary.

Hitherto by the methods employed for purpose of this separation the products resulting therefrom have varied according to the proportions of the iron and titanium contents of the treated ores.

The process is specially adapted for varying conditions. Thus where the percentage of titanium content in an ore is high the iron may be considered of little or no value. Where the iron content is high and power cheap, electrolytic iron may be the end in view and the titanium merely a waste or by product.

By means of my process set forth in detail hereinafter a great economy in the quantity of reagents employed is secured and also a reduction in the size of the apparatus required is obtained.

The process consists briefly in the preliminary conversion of the iron content into metallic iron in the form known as iron sponge, by means of a reduction of the ore to the extent that the titanium content is unaffected. The iron sponge is then dissolved out by a suitable solvent and a residue is produced high in titanium but with a minimum of iron. The iron solution may be utilized for electro deposition or the production of pigments, while the residue with its high content of titanium is suitable for the production of titanium oxide, now in demand as a pigment.

In order to fully disclose my process and how the said products are obtained, I will now describe the treatment of a titaniferous iron ore in detail. Taking for example such an ore containing over 40% iron and over 30% titanium, the ore is ground to a fine powder and dressed if necessary to remove gangue matter in any convenient manner.

To this is added from 25% to 33% by weight of comminuted carbon such as charcoal and the whole mass is thoroughly mixed.

The mixture is heated in a reducing furnace in the absence of air at a temperature of about from 900° C. to 1050° C. for a period sufficient to convert the iron content into metallic iron in the form of iron sponge but without affecting the titanium content to any extent. The powdered ore may be reduced to sponge without the addition of carbon, in a reducing gas such as carbon monoxide at about the same temperature. It is of the greatest importance that any fusion or sintering should be avoided.

The treated mixture is then cooled in an non-oxidizing atmosphere, and then subjected to some form of separation such as magnetic separation, to remove the residual carbon and any ash and gangue that remains in the mixture. This separation will be unnecessary where the reduction is obtained by gases.

I am aware that U. S. Patent No. 921,685, May 18th, 1909, Production of titanium oxides, discloses a process of reducing ilmenite and removing the reduced iron therefrom but this process is carried on at a high temperature about 1800° C. and it results in producing a fused or sintered mass which requires to be crushed before the iron content can be removed and which exhibits other objectionable characteristics. Whereas in my process I employ a comparatively low temperature from about 900° C. to 1050° C. approximately in the reducing furnace, with the result that the finely ground iron ore is converted into metallic iron or what is known as iron sponge without any fusion or sintering, and remains still in a finely divided form. The material thus provided is readily treatable in a magnetic separator or by other suitable means and is then in a form and condition peculiarly adapted to the subsequent dissolution treatment as fully set forth hereinafter.

I have further found that the reduction of titaniferous iron ores to iron sponge can only be effected completely at temperatures well over 800° C.

The product of this separation is then treated in a leaching vat with a solvent to dissolve the metallic iron or sponge.

I prefer to use a solution of ferric chloride $FeCl_3$ as a solvent but dilute sulphuric acid or dilute hydrochloric acid may be substituted in some cases when a ferrous chloride product is not required.

If ferric chloride is employed a temperature of about 80° C. is desirable, while in the case of using either of the acids no heating is necessary. The time required by the former treatment is much longer than that taken by either of the acids to completely dissolve the iron content.

The amount of solvent employed should be that approximately sufficient to dissolve the amount of iron content in the quantity of the mixture being treated.

The solution containing the dissolved iron is then separated from the insoluble residue by decantation, filtration and washing.

What I claim is:—

1. The process of treating titaniferous ore containing iron, consisting of reducing the comminuted ore to convert the iron into sponge, but without fusion or sintering, leaching the reduced ore with sufficient solvent to dissolve the iron.

2. The process of treating titaniferous ore containing iron, consisting of reducing the comminuted ore at a temperature of about from 900° C. to 1050° C., to convert the iron into sponge, but without fusion or sintering, leaching the reduced ore with sufficient solvent to dissolve the iron.

3. The process of treating titaniferous ore containing iron, consisting of reducing the comminuted ore with the addition of carbon at a temperature of about from 900° C. to 1050° C., to convert the iron into sponge, but without fusion or sintering, separating the residual carbon ash and gangue, and leaching the residue with sufficient solvent to dissolve the iron.

4. The process of treating titaniferous ore containing iron, consisting in reducing the comminuted ore with the addition of from 25% to 33% of carbon, at a temperature of about from 900° C. to 1050° C., to convert the iron into sponge, but without fusion or sintering, cooling in a non-oxidizing atmosphere, separating the residual carbon ash and gangue, and leaching the residue with sufficient solvent to dissolve the iron.

5. The process of treating titaniferous ore containing iron, consisting in reducing the comminuted ore with the addition of from 25% to 33% of carbon, at a temperature of about from 900° C. to 1050° C. for a time sufficient to convert the iron into sponge but without fusion or sintering, cooling in a non-oxidizing atmosphere, separating the residual carbon ash and gangue, and leaching the residue with sufficient solvent to dissolve the iron.

6. The process of treating titaniferous ore containing iron, consisting in reducing the comminuted ore with the addition of from 25% to 33% of carbon, at a temperature of about from 900° C. to 1050° C. for a time sufficient to convert the iron into sponge but without fusion or sintering, cooling in a non-oxidizing atmosphere, separating the residual carbon ash and gangue, and leaching the residue with sufficient solvent to dissolve the iron at a temperature of about 80° C.

7. The process of treating titaniferous ore containing iron, consisting in reducing the comminuted ore to convert the iron into sponge but without fusion or sintering, leaching the reduced ore with sufficient ferric chloride to dissolve the iron and withdrawing the solution, washing and drying the residue.

8. The process of treating titaniferous ore to eliminate the iron content consisting of reducing the comminuted ore with the addition of carbon in a furnace at a temperature sufficient to convert the iron into the metallic state without fusion or sintering, but not sufficient to reduce the titanium content, and then dissolving out the iron.

CARL RAYMOND WHITTEMORE.